US009640076B2

(12) United States Patent
Hillenbrand et al.

(10) Patent No.: US 9,640,076 B2
(45) Date of Patent: May 2, 2017

(54) COMMUNICATION DEVICE AND COMMUNICATION METHOD FOR A VEHICLE

(71) Applicant: Robert Bosch GmbH, Stuttgart (DE)

(72) Inventors: Stefan Hillenbrand, Moeglingen (DE); Christian Danz, Stuttgart (DE)

(73) Assignee: ROBERT BOSCH GMBH, Stuttgart (DE)

( * ) Notice: Subject to any disclaimer, the term of this patent is extended or adjusted under 35 U.S.C. 154(b) by 0 days.

(21) Appl. No.: 14/411,037

(22) PCT Filed: Apr. 29, 2013

(86) PCT No.: PCT/EP2013/058838
§ 371 (c)(1),
(2) Date: Dec. 23, 2014

(87) PCT Pub. No.: WO2014/000913
PCT Pub. Date: Jan. 3, 2014

(65) Prior Publication Data
US 2015/0339925 A1 Nov. 26, 2015

(30) Foreign Application Priority Data

Jun. 26, 2012 (DE) .......... 10 2012 210 798

(51) Int. Cl.
*G08G 1/00* (2006.01)
*G08G 1/16* (2006.01)
(Continued)

(52) U.S. Cl.
CPC .............. *G08G 1/166* (2013.01); *B60Q 1/506* (2013.01); *B60Q 5/006* (2013.01); *B60Q 5/008* (2013.01);
(Continued)

(58) Field of Classification Search
CPC .......... B60R 1/00; B60Q 1/506; B60Q 1/447; B60Q 5/006; B60Q 5/008; B60Q 9/008; G08G 1/166
(Continued)

(56) References Cited

U.S. PATENT DOCUMENTS 8,514,100 B2 * 8/2013 Yamashita .............. G08G 1/166
340/4.1
8,903,617 B2 * 12/2014 Braunberger .......... B60Q 1/447
701/70
(Continued)

FOREIGN PATENT DOCUMENTS

CN 101098405 A 1/2008
CN 101842263 A 9/2010
(Continued)

OTHER PUBLICATIONS

International Search Report for PCT/EP2013/058838, issued on Jul. 25, 2013.

*Primary Examiner* — Hoi Lau
(74) *Attorney, Agent, or Firm* — Gerard Messina

(57) ABSTRACT

A communication device for a vehicle is described, having a recording apparatus for recording the surroundings of the vehicle and a signaling apparatus. Also included is a controller for controlling the signaling apparatus as a function of the recorded surroundings. The signaling apparatus sends a recording signal formed corresponding to the recorded surroundings, to the surroundings. Also described is a corresponding communication method, a corresponding computer program, a corresponding vehicle, and a corresponding communication system.

19 Claims, 2 Drawing Sheets

(51) Int. Cl.
  *B60Q 9/00* (2006.01)
  *B60R 1/00* (2006.01)
  *B60Q 5/00* (2006.01)
  *B60Q 1/50* (2006.01)

(52) U.S. Cl.
  CPC ................ *B60Q 9/008* (2013.01); *B60R 1/00* (2013.01); *B60R 2300/8033* (2013.01)

(58) Field of Classification Search
  USPC ............ 340/435, 901, 4.1; 701/70; 348/148, 348/E7.085, E5.09
  See application file for complete search history.

(56) References Cited

U.S. PATENT DOCUMENTS

| | | | |
|---|---|---|---|
| 8,954,251 B2 * | 2/2015 | Braunberger | B60W 30/143 701/70 |
| 9,073,476 B2 * | 7/2015 | Nikol | B60Q 1/0023 |
| 9,073,484 B2 * | 7/2015 | Aimura | B60R 1/00 |
| 9,090,205 B2 * | 7/2015 | Nagaoka | B60Q 9/008 |
| 9,123,249 B2 * | 9/2015 | Braunberger | G06F 19/00 |
| 9,126,524 B2 * | 9/2015 | Fulton | B60Q 5/00 |
| 9,150,153 B2 * | 10/2015 | Konet | B60Q 5/008 |
| 9,187,035 B2 * | 11/2015 | Nakajima | B60Q 5/008 |
| 9,189,452 B2 * | 11/2015 | Hahne | G06F 17/00 |
| 9,217,380 B2 * | 12/2015 | Braunberger | F02D 17/04 |
| 9,227,563 B2 * | 1/2016 | Hamdan | B60Q 1/525 |
| 9,235,990 B2 * | 1/2016 | Aimura | G08G 1/16 |
| 2010/0182432 A1 * | 7/2010 | Augst | B60R 1/00 348/148 |
| 2011/0063443 A1 * | 3/2011 | Yang | H04N 7/185 348/148 |
| 2011/0199199 A1 * | 8/2011 | Perkins | B60Q 1/506 340/435 |
| 2011/0234422 A1 * | 9/2011 | Yamashita | B60Q 5/006 340/901 |

FOREIGN PATENT DOCUMENTS

| | | |
|---|---|---|
| CN | 102165503 A | 8/2011 |
| DE | 102007046319 | 4/2009 |
| DE | 102009028476 | 2/2011 |

* cited by examiner

COMMUNICATION DEVICE AND COMMUNICATION METHOD FOR A VEHICLE

FIELD OF THE INVENTION

The present invention relates to a communication device and a communication method for a vehicle. Moreover, the present invention relates a computer program, a vehicle and a communication system.

BACKGROUND INFORMATION

A method and a device for warning a pedestrian of approaching vehicles are described in German document German Published Patent Appln. No. 2010 001 869. In this connection, the device includes a receiving device for electromagnetic radiation, an electromagnetic signal being received, using the receiving device, which is emitted by a vehicle from which a danger of collision may originate. When a threatening danger of collision is detected, the pedestrian is warned of the threatening collision, using a warning signal which is emitted by a warning apparatus mounted in the device.

SUMMARY

An object on which the present invention is based may be seen as providing a communication device for a vehicle which enables an interaction between a vehicle and the surroundings of the vehicle, so that dangerous situations may be avoided.

The object on which the present invention is based may also be seen as providing a corresponding communication method for a vehicle, a corresponding computer program, a corresponding vehicle as well as a corresponding communication system.

According to one aspect, a communication device for a vehicle is provided. The communication device includes a recording apparatus for recording the environment of the vehicle. A signaling apparatus is also provided. The communication device further includes a controller for controlling the signaling apparatus, as a function of the recorded surroundings, the signaling apparatus being developed for sending a recording signal developed corresponding to the recorded surroundings, to the surroundings.

According to one further aspect, a communication method for a vehicle is provided. A recording apparatus records the surroundings of the vehicle. A controller controls a signaling apparatus as a function of the recorded surroundings, so that the signaling apparatus sends a recording signal to the surroundings corresponding to the recorded surroundings.

According to another aspect, a computer program is provided, which includes program code to execute the communication method for a vehicle, when the computer program is run on a computer.

According to another aspect, a vehicle is provided that includes the communication device for a vehicle.

According to still another aspect, a communication system is provided, which includes the communication device for a vehicle and a receiver for receiving the recording signal sent.

Because, as a function of the recorded surroundings, a recording signal is automatically sent to the surroundings of the vehicle, an interaction is advantageously enabled between the vehicle and the surroundings of the vehicle. This being the case, the surroundings of the vehicle advantageously receive particularly the information to what extent or how accurately the vehicle has recorded the surroundings. People in the surroundings of the vehicle may thus particularly detect advantageously whether they have been detected by the vehicle. For this to happen, these people do not, as a rule, have to carry any special devices with them.

What usually happens is that, when the vehicle has detected a person in the surroundings, this information is taken into account during further vehicle guidance. This takes place particularly if the vehicle is an automatically traveling vehicle or an autonomously traveling vehicle, that is, without an active driver who controls the vehicle. Since the person has recognized that the vehicle has detected him, the person may usually assume that the vehicle is taking into account the presence of the person in the further vehicle guidance. Thus, for example, the person may usually rely on being able to cross a pedestrian walk or a road safely.

If, for example, the recording apparatus has not yet recorded the surroundings of the vehicle, then correspondingly no recording signal is sent to the surroundings. The absence or the non-presence of this recording signal is then a sign for the surroundings, especially for a person or traffic participant, that the vehicle has not yet detected or recorded them. This being the case, the person or the traffic participant will usually behave correspondingly with greater care. Possible accidents between the vehicle and the person may thus be advantageously avoided.

A recording signal, within the meaning of the present invention, is particularly a carrier of the information that the surroundings have been recorded. A recording signal is thus particularly a sign having the meaning that the surroundings have been recorded. This information may, for instance, be transported or sent to the surroundings using an optical and/or an acoustical signal. A recording signal may especially include the information as to whether objects or persons have been detected, that is, recorded in the surroundings. A recording signal may especially include the information that objects and persons in the surroundings have not been detected and recorded in an unequivocal manner.

The surroundings of the vehicle have, as a rule, preferably one or more traffic participants such as a pedestrian, a cyclist, a motor cyclist or a vehicle driver of an additional vehicle. This, then, means in particular that a nonverbal communication is being carried on between the vehicle and the traffic participant or traffic participants by sending the recording signal.

According to one specific embodiment, it may be provided that the signaling apparatus includes a camera that is situated in a swiveled manner, so as to be able to swivel the camera as a function of the recorded surroundings. In this respect, the information that the surroundings have been recorded is advantageously transmitted or sent to the surroundings using a swiveling of the camera. This being the case, in this case, the recording signal is an optical signal: The swiveling of the camera. For traffic participants, this type of information transmission is particularly intuitive, since normally a real driver swivels or turns his head in the direction of the traffic participant, and takes up visual contact, so as to signal to the traffic participant that the driver has detected him.

According to another specific embodiment, it may be provided that the signaling apparatus includes an optical light transmitter for sending light having a wavelength between 380 nm and 780 nm, as a function of the recorded surroundings. This, then, means especially that the wavelength of the light to be emitted may be selected as a function of the recorded surroundings. In this instance, the transmission of the information, that the surroundings have been recorded, takes place using an optical signal, light, in this case. Light having the abovementioned wavelength, is usually able to be seen by human beings. Additional receiving units are therefore not required, but they may nevertheless be provided to facilitate the detection of the recording signal. This is particularly so if the traffic participant has restricted vision or is even blind.

In one specific embodiment, it may be provided that the signaling apparatus include and activate a vehicle illuminating apparatus as an optical sender, such as a headlight and/or a turn signal indicator, in order particularly to indicate optically to the traffic participant that it has recorded the surroundings.

According to one further specific embodiment, it may be provided, for example, that the optical sender is activated and deactivated several times in succession, analogously to sending optical Morse code. The optical sender may also, in particular, do Morse code optically, or rather send optical Morse signals.

According to one further specific embodiment, it may be provided that the optical sender emit continuous light. This would be alternative or additionally to sending in Morse code, that is, emitting pulsed light.

According to one specific embodiment, it may be provided that the optical light sender record a liquid crystal display. A liquid crystal display may also be designated as a liquid crystal screen. In English, "liquid crystal display" is normally used for this. Using a liquid crystal display, one may advantageously particularly produce optical patterns, text and/or images, in order to transmit more accurate information, with respect to the detection, to a traffic participant.

According to another specific embodiment, it may preferably be provided that the optical light sender include an LED (light emitting diode), particularly an OLED (organic light emitting diode).

In another specific embodiment, it may be provided that the optical light sender include a plastic, which is able to change color when acted upon by an electric voltage. Such a plastic may advantageously be simply applied onto car body components of the vehicle and fastened.

In one specific embodiment, it may be provided that the optical light sender emit light having wavelength of >600 nm, if the recording apparatus has not recorded or detected any traffic participants. Light having a wavelength of >600 nm usually corresponds to the color red. This is usually a warning color, so that traffic participants in the surroundings clearly recognize that the vehicle has not recorded or detected them. Thus, the traffic participants will usually behave more carefully, which is able to avoid potential accidents.

In one additional specific embodiment, it may be provided that the optical light sender emit light having a wavelength between 565 nm and 575 nm and/or having a wavelength between 575 nm and 595 nm, if the recording apparatus has detected objects in the surroundings, to be sure, but is not sure which objects are involved, in detail. This then means, in particular, that a classification of the recorded objects, what type of traffic participant is involved or whether a traffic participant is involved at all among the recorded objects, were carried out only with a certain probability of being correct. This means then that the optical light sender is emitting light having a wavelength between 565 nm and 575 nm and/or having a wavelength between 575 nm and 595 nm if a probability value assigned to a classification of detected objects is less than a predetermined probability value.

The wavelength range between 565 nm and 575 nm corresponds to the color yellow, as a rule. The wavelength range between 575 nm and 595 nm corresponds to the color orange, as a rule. Orange and yellow are usually also warning signal colors, which are usually understood by traffic participants, however, as a lesser warning as compared to the warning signal color red. Consequently, a traffic participant may advantageously be signaled that he has been recoded, to be sure, but not classified as a traffic participant.

According to one additional specific embodiment, it may be provided that the optical light sender is emitting light having a wavelength range between 520 nm and 565 nm, if the recording apparatus has both detected an object in the surroundings and has also classified it with a certain probability, and is thus sure that an individual object is a pedestrian, for example, a cyclist or another vehicle. This means then that the optical light sender is emitting light having a wavelength between 520 nm and 565 nm if a probability value assigned to a classification of detected objects is greater than a predetermined probability value.

Light having this wavelength, that is, between 520 nm and 565 nm, usually corresponds to the color green and signals to a traffic participant, as a rule, that all is in order, that the vehicle, in particular, has recorded him, classified him correctly and is taking him into account in the further vehicle guidance. Consequently, it may advantageously be simply signaled to the traffic participant that he has been both recorded and also classified correctly.

According to one further specific embodiment, it may be provided that the signaling apparatus, especially the optical light sender, is developed to be situated on the body of the vehicle or on a surface of the vehicle. This particularly means that a car body may be provided for a vehicle on which the signaling apparatus is situated, especially the optical light sender. This then means particularly that a vehicle may be provided in which the signaling apparatus, preferably an optical light sender, is situated on the body of the vehicle and/or a surface of the vehicle.

In one other specific embodiment, it may be provided that only regions of the car body or surface of the vehicle including optical light senders emit light having a predetermined wavelength, which point to a respectively recorded traffic participant. Thereby a blind spot in the recording apparatus for additional traffic participants is advantageously easy to detect from the outside. Thus, a plurality of traffic participants in the surroundings of the vehicle are easily able to detect whether only they have been detected by the vehicle or whether other, additional traffic participants have also been detected.

According to one further specific embodiment, a plurality of optical light senders may be provided which, in particular, may be formed the same or preferably differently.

In one further specific embodiment, it may be provided that the signaling apparatus includes a sound transmitter for sending a sound selected corresponding to the recorded surroundings. That is, the recording signal is particularly a sound wave, in this case.

Within the meaning of the present invention, sound especially designates a mechanical wave in a medium, air, in this case.

In one specific embodiment it may be provided that sound having a frequency between 16 Hz to 20 kHz is sent out. In this frequency range, sound is able to be heard by human beings, as a rule, so that traffic participants are able to hear acoustically whether they have been detected or not.

In one additional specific embodiment, it may be provided that sound having a frequency between 20 kHz to 1.6 GHz is sent out.

In one further specific embodiment it may be provided that sound having a frequency of less than 16 Hz is sent out.

The abovementioned frequency ranges, that is, <16 Hz and between 20 kHz and 1.6 GHz, to be sure, are usually not audible by human beings. It may, however, preferably be provided that the receiver of the communication system is developed to detect sound having frequencies in the abovementioned frequency ranges. For this purpose, it may particularly be provided that, in correspondence to the detected signal, a signal perceptible to a human being, especially an optical signal and/or an acoustical signal and/or a haptic signal is output. This particularly has the advantage that additional traffic participants, not having such a receiver, are not disturbed, so that only a traffic participant of the appropriate receiver has transmitted to him the information relative to him. This being the case, other traffic participants will not be confused.

According to one further specific embodiment, a plurality of sound senders are provided which, in particular, may be formed the same or preferably differently.

According to one specific embodiment, it may be provided that pulsed sound is sent out alternatively or instead of a continuous sound signal, analogously to an acoustical Morse code signal.

In one further specific embodiment, it may be provided that the signaling apparatus include a radio wave transmitter for sending radio waves as a function of the recorded surroundings. The recorded signal is a radio wave, in particular, in this case. Preferably, it is also possible to provide multiple radio wave transmitters, which may have the same or preferably a different design.

Radio waves within the meaning of the present invention are particularly electromagnetic waves having a wavelength between 10 cm and 100 km. The electromagnetic waves particularly have a frequency range of a few Kilohertz to about 3 Gigahertz. It is true that these radio waves cannot be perceived by a human being. However, it may advantageously be provided that the receiver of the communication system is developed appropriately to receive these radio waves. For instance, the receiver may be included in a mobile telephone, i.e. a wireless telephone, especially a mobile radio telephone. This then means in particular that the radio wave transmitter sends radio waves in a frequency range which is typical for mobile radio frequency ranges. This particularly means that the mobile phone of the traffic participant thereby in an advantageous manner receives the information as to whether, for example, the traffic participant was recorded or not. The mobile telephone may advantageously be developed to notify the carrier, that is, the traffic participant, in an optical and/or acoustical and/or haptic manner, which information was transmitted exactly by the communication device, that is, particularly the vehicle, to the traffic participant. That is, the mobile telephone receives the radio waves and thereupon emits an optical and/or an acoustical and/or an haptic signal, or rather provides it.

According to one further specific embodiment, it may be provided that the receiver be part of a mobile radio network. The receiver may be included in a mobile radio pole, for example. The mobile radio pole may preferably include an additional transmitter which sends the radio wave and/or an additional radio wave formed as a function of the radio wave to the mobile telephone. Providing an additional radio wave which is formed as a function of the radio wave and which, this being the case, includes the information transported by the radio wave, makes possible in an advantageous manner that radio waves may be selected which are able to be received particularly well by the mobile telephone. Furthermore, using this indirect transmission, a standardized interface is also created, inasmuch as a manufacturer no longer has to worry about possible receiving problems on the part of the mobile phone. It is sufficient if he takes care of communication between a signaling apparatus and a mobile radio pole. The feeding of the recording signal to the mobile radio network is then, as a rule, taken over by the mobile radio network operator, who usually knows his own network best.

In one other specific embodiment, it may be provided that the signaling apparatus include an intervention apparatus for intervening in a vehicle guidance as a function of the recorded surroundings. The information as to whether the surroundings have been recorded or not may, in this case, thus be transmitted using a changed vehicle guidance. A traffic participant may see this changed vehicle guidance, for example. The traffic participant is then preferably able to hear the changed vehicle guidance, based on braking noises, for example. The recording signal may also preferably include and optical or an acoustical signal.

A changed vehicle guidance may include braking, accelerating and/or a change in the travel direction, for instance.

In one specific embodiment, it may be provided that, in response to the recording of a traffic participant, the vehicle is braked, in order to signal to the traffic participant that he has been detected.

According to one further specific embodiment, it may be provided that the signaling apparatus include a camera that is situated in a swivelable manner, and upon the classification of an included object of the surroundings as a traffic participant, the camera swivels in the direction of the traffic participant.

In yet another specific embodiment, it may be provided that the camera forms at least one image, particularly a plurality of images, of the traffic participant, which is/are checked to see whether the traffic participant is looking in the direction of the camera. This advantageously creates a backward channel to check whether the traffic participant has recognized that he himself has been recorded and recognized by the recording apparatus. Moreover, the backward channel, namely, the forming of images of the traffic participant using the camera, is able to be used preferably to check whether a current classification of the traffic participant has been carried out correctly. Thus it may advantageously be checked, for instance, whether the traffic participant is a pedestrian or a cyclist. This being the case, traffic participants may advantageously be distinguished better from one another. This means that, particularly in a first classification, the traffic participant has been classified as "not a car", the recording apparatus not being sure whether he is a pedestrian, a cyclist or a motor cyclist, for example. By the use of the backward channel one may then advantageously effect a more accurate classification or rather an improved differentiation.

The abovementioned specific embodiment using a camera situated in a swivelable manner may be seen as analogous to a nonverbal communication between a real vehicle driver and a traffic participant positioned outside the vehicle. In this case too, a nonverbal communication takes place to the effect that the vehicle driver looks at the traffic participant, that is, he swivels his head in the direction of the traffic participant, to signal him that he has been detected. As soon as the traffic participant has recognized this, he will also turn his head in the direction of the vehicle driver in order to look at him and thus to signal him that he has recognized that the vehicle driver has recognized him, namely, that the message of the vehicle driver has arrived.

According to another additional specific embodiment, it may be provided that the signaling apparatus is developed to be situated on a component of a vehicle. This means particularly that a component may be provided that includes the signaling apparatus. This means particularly that the vehicle including this component may have the signaling apparatus. Such a component may be a roof edge or a decorative molding for the vehicle. Preferably, multiple components may be provided, which may have the same or a different design. This means particularly that the signaling apparatus may be situated at the roof edge and/or on the decorative molding of the vehicle. For instance, the signaling apparatus may also be situated in a bumper bar of the vehicle. That being the case, the component may thus be, in particular, a bumper bar.

In another specific embodiment, it may be provided that the signaling apparatus is developed to emit the recording signal exclusively in a predetermined direction. A directed recording signal is thus advantageously output or emitted. Because of that, in the case of several traffic participants, information is able to be transmitted only to that traffic participant who has the greatest relevance with respect to a possible collision. Additional traffic participants, who are not located in danger of a possible collision, are not disturbed or confused.

In one further specific embodiment, the recording apparatus may have one or more sensors for recording by sensor of the surroundings. The sensors may, for instance, be formed to be equal or preferably different. The sensors may be, for example, lidar sensors, radar sensors, infrared sensors or video sensors. The recording apparatus may include a stereo camera, for example.

DETAILED DESCRIPTION

Figure 1:
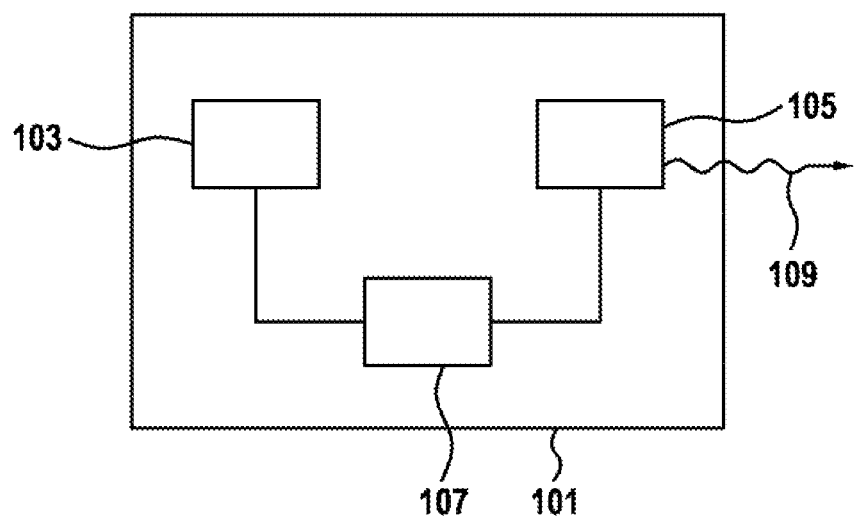
FIG. 1 shows a communication device for a vehicle.

In the following text, the same reference numerals are used for the same features.

FIG. 1 shows a communication device 101 for a vehicle (not illustrated).

Communication device 101 includes a recording apparatus 103 for recording the environment of the vehicle. It may preferably be provided that recording apparatus 103 includes one sensor or a plurality of sensors for the recording of the surroundings by sensor. The recording apparatus may include, for instance, a camera, especially a stereo camera, a radar sensor, a lidar sensor and/or video sensors.

Moreover, communication device 101 includes a signaling apparatus 105. Furthermore, a controller 107 is provided, which is able to control signaling apparatus 105 as a function of the surroundings recorded. In this instance, signaling apparatus 105 is developed for sending a recording signal 109, which is developed corresponding to the surroundings recorded, to the surroundings.

According to one specific embodiment that is not shown, it may be provided that signaling apparatus 105 include a camera that is situated in a swivelable manner, so as to be able to swivel the camera as a function of the recorded surroundings.

Figure 2:
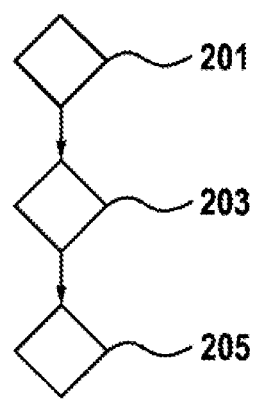
FIG. 2 shows a flow chart of a communication method for a vehicle.

FIG. 2 shows a flow chart of a communication method for a vehicle.

According to a step 201, a recording apparatus records the surroundings of the vehicle. In a step 203, a controller controls a signaling apparatus as a function of the recorded surroundings, so that according to step 205, the signaling apparatus sends a recording signal to the surroundings corresponding to the recorded surroundings.

In a specific embodiment not shown, it may be provided that the signaling apparatus include a camera that is situated in a swivelable manner, and upon the classification of a recorded object of the surroundings as a traffic participant, the camera swivels in the direction of the traffic participant.

Figure 3:
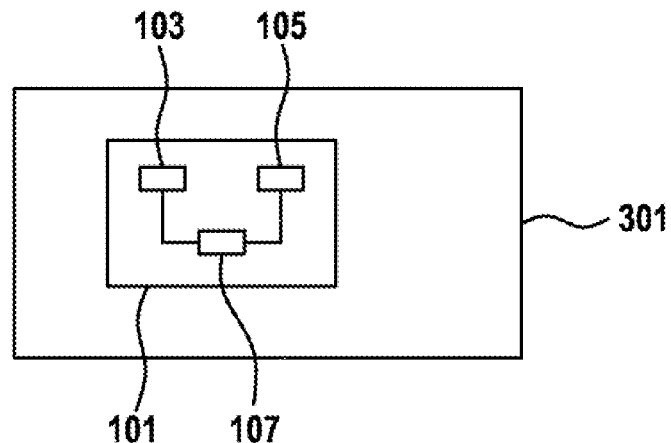
FIG. 3 shows a vehicle.

FIG. 3 shows a vehicle 301.

Vehicle 301 includes communication device 101 as in FIG. 1.

Consequently, it is advantageously enabled for a nonverbal communication automatically to take place between vehicle 301 and traffic participants. In particular, if vehicle 301 is an autonomously traveling vehicle, that is, a vehicle without an active vehicle driver, it may nevertheless be notified to a traffic participant whether the vehicle has detected the traffic participant. The traffic participant may set himself appropriately for this situation, whereby accidents may advantageously be avoided. By the nonverbal communication method between vehicle 301 and the traffic participant, traffic safety is thus advantageously increased.

In particular, if the communication device includes a camera situated in a swivelable manner, visual contact on the part of the vehicle with the traffic participant is simulated analogously to eye contact of a real vehicle driver with the traffic participant. Consequently, the traffic participant advantageously receives especially the information that he has not been overlooked by vehicle 301.

Figure 4:
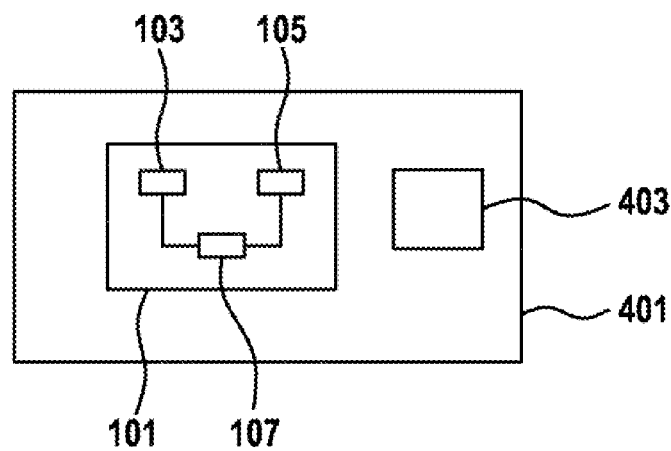
FIG. 4 shows a communication system.

FIG. 4 shows a communication system 401.

Communication system 401 includes communication device 101 and a receiver 403 for receiving the recording signal sent.

Receiver 403, for example, may be a mobile telephone. The traffic participant will usually carry receiver 403, so that via it, a communication is enabled between communication device 101 and the traffic participant.

In one specific embodiment not shown, it may be provided that the receiver is developed to receive radio waves, sound waves and/or light having a wavelength between 380 nm and 780 nm.

In summary, the present invention particularly includes the idea that a vehicle traveling automatically or autonomously, that is, without an active vehicle driver, notifies other traffic participants, for instance, via a simulated eye contact by a camera and/or by emitting light, sound and/or radio waves, whether it has detected these and/or is taking them into account in its motion planning, that is, the further vehicle guidance, that is, corresponding in particular, in an accident-preventing manner. If this acknowledgement remains absent for the traffic participants, the traffic participants may usually assume that they have not yet been detected by the vehicle, and they will correspondingly behave more carefully. In this way, in spite of the error in the perception and the recording of the automatically or autonomously traveling vehicle, a collision may advantageously be avoided.

What is claimed is:

1. A communication device for a vehicle, comprising:
   a recording device for recording surroundings of the vehicle;
   a signaling apparatus; and
   a controller for controlling the signaling apparatus as a function of the recorded surroundings, wherein the signaling apparatus sends a recording signal, developed corresponding to the recorded surroundings, to the surroundings;
   wherein the signaling apparatus includes a camera that is situated in a swivelable manner, to swivel the camera as a function of the recorded surroundings, and upon a classification of a recorded object of the surroundings as a traffic participant, swivels the camera in a direction of the traffic participant,
   wherein the camera forms at least one image of the traffic participant; and
   wherein the image of the traffic participant is checked as to whether the traffic participant is looking in a direction of the camera.

2. The communication device as recited in claim 1, wherein the signaling apparatus includes an optical light transmitter for sending light having a wavelength between 380 nm and 780 nm, as a function of the recorded surroundings.

3. The communication device as recited in claim 1, wherein the signaling apparatus includes a sound transmitter for sending a sound selected corresponding to the recorded surroundings.

4. The communication device as recited in claim 1, wherein the signaling apparatus includes a radio wave transmitter for sending radio waves as a function of the recorded surroundings.

5. The communication device as recited in claim 1, wherein the signaling apparatus includes an intervention apparatus for intervening in a vehicle guidance, as a function of the recorded surroundings.

6. A communication method for a vehicle, comprising:
   recording, by a recording apparatus, surroundings of the vehicle;
   controlling, by a controller, a signaling apparatus as a function of the recorded surroundings, so that the signaling apparatus sends a recording signal, that is formed corresponding to the recorded surroundings, to the surroundings, wherein the signaling apparatus includes a camera that is situated in a swivelable manner, to swivel the camera as a function of the recorded surroundings, and upon a classification of a recorded object of the surroundings as a traffic participant, swivels the camera in a direction of the traffic participant;
   forming, by the camera, at least one image of the traffic participant; and
   checking the image of the traffic participant as to whether the traffic participant is looking in a direction of the camera.

7. A non-transitory computer readable medium having a computer program, which is executable by a processor, comprising:
   a program code arrangement having program code for providing communication, by performing the following:
   recording, by a recording apparatus, surroundings of the vehicle; and
   controlling, by a controller, a signaling apparatus as a function of the recorded surroundings, so that the signaling apparatus sends a recording signal, that is formed corresponding to the recorded surroundings, to the surroundings, wherein the signaling apparatus includes a camera that is situated in a swivelable manner, to swivel the camera as a function of the recorded surroundings, and upon a classification of a recorded object of the surroundings as a traffic participant, swivels the camera in a direction of the traffic participant;
   forming, by the camera, at least one image of the traffic participant; and
   checking the image of the traffic participant as to whether the traffic participant is looking in a direction of the camera.

8. A vehicle, comprising:
   a communication device, including:
   a recording device for recording surroundings of the vehicle;
   a signaling apparatus; and
   a controller for controlling the signaling apparatus as a function of the recorded surroundings, wherein the signaling apparatus sends a recording signal, developed corresponding to the recorded surroundings, to the surroundings;
   wherein the signaling apparatus includes a camera that is situated in a swivelable manner, to swivel the camera as a function of the recorded surroundings, and upon a classification of a recorded object of the surroundings as a traffic participant, swivels the camera in a direction of the traffic participant,
   wherein the camera forms at least one image of the traffic participant; and
   wherein the image of the traffic participant is checked as to whether the traffic participant is looking in a direction of the camera.

9. A communication system, comprising:
   a communication device, including:
   a recording device for recording surroundings of a vehicle;
   a signaling apparatus; and
   a controller for controlling the signaling apparatus as a function of the recorded surroundings, wherein the signaling apparatus sends a recording signal, developed corresponding to the recorded surroundings, to the surroundings, wherein the communication system receives the recording signal sent;
   wherein the signaling apparatus includes a camera that is situated in a swivelable manner, to swivel the camera as a function of the recorded surroundings, and upon a classification of a recorded object of the surroundings as a traffic participant, swivels the camera in a direction of the traffic participant,
   wherein the camera forms at least one image of the traffic participant; and
   wherein the image of the traffic participant is checked as to whether the traffic participant is looking in a direction of the camera.

10. A communication device for a vehicle, comprising:
    a recording device for recording surroundings of the vehicle;
    a signaling apparatus; and
    a controller for controlling the signaling apparatus as a function of the recorded surroundings, wherein the signaling apparatus sends a recording signal, developed corresponding to the recorded surroundings, to the surroundings;

wherein a recording signal includes information as to objects or persons in the surroundings which are recorded in the surroundings, and wherein a recording signal includes information that the objects and the persons in the surroundings have not been recorded, and wherein the signaling apparatus includes a camera that is situated in a swivelable manner, to swivel the camera as a function of the recorded surroundings, wherein at least one image of the traffic participant is formed by the camera, and wherein the image of the traffic participant is checked as to whether the traffic participant is looking in a direction of the camera.

11. The communication device as recited in claim 10, wherein the signaling apparatus includes an optical light transmitter for sending light having a wavelength between 380 nm and 780 nm, as a function of the recorded surroundings.

12. The communication device as recited in claim 10, wherein the signaling apparatus includes a sound transmitter for sending a sound selected corresponding to the recorded surroundings.

13. The communication device as recited in claim 10, wherein the signaling apparatus includes a radio wave transmitter for sending radio waves as a function of the recorded surroundings.

14. The communication device as recited in claim 10, wherein the signaling apparatus includes an intervention apparatus for intervening in a vehicle guidance, as a function of the recorded surroundings.

15. A communication method for a vehicle, comprising:
recording, by a recording apparatus, surroundings of the vehicle;
controlling, by a controller, a signaling apparatus as a function of the recorded surroundings, so that the signaling apparatus sends a recording signal, that is formed corresponding to the recorded surroundings, to the surroundings;
forming, by the camera, at least one image of the traffic participant; and
checking the image of the traffic participant as to whether the traffic participant is looking in a direction of the camera;
wherein a recording signal includes information as to objects or persons in the surroundings which are recorded in the surroundings, and wherein a recording signal includes information that the objects and the persons in the surroundings have not been recorded, and
wherein the signaling apparatus includes a camera that is situated in a swivelable manner, and upon a classification of a recorded object of the surroundings as a traffic participant, swivels the camera in a direction of the traffic participant.

16. The communication method as recited in claim 15, wherein the signaling apparatus includes an optical light transmitter for sending light having a wavelength between 380 nm and 780 nm, as a function of the recorded surroundings.

17. The communication method as recited in claim 15, wherein the signaling apparatus includes a sound transmitter for sending a sound selected corresponding to the recorded surroundings.

18. The communication method as recited in claim 15, wherein the signaling apparatus includes a radio wave transmitter for sending radio waves as a function of the recorded surroundings.

19. The communication method as recited in claim 15, wherein the signaling apparatus includes an intervention apparatus for intervening in a vehicle guidance, as a function of the recorded surroundings.

* * * * *